United States Patent [19]

Hefner, Jr.

[11] 4,443,580
[45] Apr. 17, 1984

[54] DCPD MODIFIED POLYESTER PHYSICAL PROPERTY IMPROVEMENT

[75] Inventor: Robert E. Hefner, Jr., Jackson, Tex.

[73] Assignee: The Dow Chemical Company, Midland, Mich.

[21] Appl. No.: 411,169

[22] Filed: Aug. 25, 1982

[51] Int. Cl.³ ............................................. C08L 67/06
[52] U.S. Cl. ....................................... 525/44; 525/445; 525/421; 528/288; 528/298; 523/527; 428/425.6; 428/431
[58] Field of Search .......................... 525/44, 445, 421; 528/288, 344, 345, 298

[56] References Cited

U.S. PATENT DOCUMENTS

| | | | |
|---|---|---|---|
| 3,347,806 | 10/1967 | Zimmermann | 525/17 |
| 3,986,992 | 10/1976 | Canning | 525/44 |
| 4,148,765 | 4/1979 | Nelson | 525/445 |
| 4,167,542 | 9/1979 | Nelson | 525/445 |
| 4,233,432 | 11/1980 | Curtis | 525/49 |
| 4,332,931 | 6/1982 | Haegawa | 525/445 |

*Primary Examiner*—John C. Bleutge
*Assistant Examiner*—Patricia Short
*Attorney, Agent, or Firm*—A. R. Lindstrom

[57] ABSTRACT

The corrosion resistance of dicyclopentadiene (DCPD) modified unsaturated polyester or DCPD modified unsaturated polyesteramide resins can be improved by replacing a part of the styrene used as a reactant diluent in the resin with materials, such as divinylbenzene.

15 Claims, No Drawings

DCPD MODIFIED POLYESTER PHYSICAL PROPERTY IMPROVEMENT

BACKGROUND OF THE INVENTION

Unsaturated polyesters are useful in the fabrication of a wide variety of products. They are made by reacting dibasic acids, such as phthalic anhydride, maleic anhydride, etc., with difunctional alcohols, such as ethylene glycol, propylene glycol, etc. By varying the starting monomers, some can be made spinnable into fibers and filaments; some are useful in casting; some are moldable; still others can be formulated into coatings. The physical and chemical properties can be changed through choice of monomers, polymerization procedures and other means.

Recently, polyesters have been modified with dicyclopentadiene (DCPD) to result in products having reduced shrinkage upon curing, enhanced hydrophobicity and better economics than the corresponding unmodified polyesters.

More recently, a class of polyesteramides has been developed. Basically, those materials have been the random interpolymerization of a dicarboxylic acid with a diol and a diamine. The products have exhibited a spectrum of properties substantially different from either polyesters or polyamides.

Although DCPD modified polyesters have been useful in making products acceptable in the marketplace, there has been a trade off: those modified polyesters have generally reduced corrosion resistance.

SUMMARY OF THE INVENTION

This invention provides a new class of DCPD modified unsaturated polyesters and DCPD modified unsaturated polyesteramides having improved properties. Materials such as divinylbenzene (DVB), when added increase corrosion resistance and change other properties.

DETAILED DESCRIPTION OF THE INVENTION

DCPD is sold commercially as a product of about 97 or greater percent purity. It is also sold as a $C_{10}$ hydrocarbon concentrate prepared by dimerizing a crude $C_5$ stream from the cracking of hydrocarbons as taught in U.S. Pat. No. 3,556,239.

These concentrates have as the main reactive components about 70 to about 90 percent by weight of DCPD, about 5 to about 30 percent by weight of the mixed Diels-Alder dimers of diolefins such as butadiene, cis- and trans-piperylene, isoprene, cyclopentadiene and methyl cyclopentadiene. The remainder of these concentrates generally comprise residual $C_5$ hydrocarbons and oligomers of the above diolefins.

Examples of some of the dimers which have been identified of these concentrates are the Diels-Alder adducts of two moles of isoprene (isoprene dimers), the adduct of cyclopentadiene and piperylene, and the like.

Either DCPD or DCPD concentrate can be used in this invention.

An unsaturated polyester is a condensation polymer produced by condensing approximately equimolar proportions of at least one polycarboxylic acid and/or anhydride, at least a portion of which contains ethylenic unsaturation, with at least one polyol.

Examples of such unsaturated acids include maleic, fumaric, itaconic and others. The remainder, if any, of the polycarboxylic acids are usually either saturated normal aliphatics, such as adipic acid, succinic acid, tetrahydrophthalic acid and the like or aromatic diacids, such as phthalic acid, isophthalic acid or the like. The term polycarboxylic acid, as used herein, is intended to embrace the anhydride as well.

The unsaturated acid and/or anhydride provides the unsaturation needed for curing the resin. Therefore, the actual ratio of unsaturated acid to saturated acid will be dictated by the degree of crosslinking desired in the cured product. That degree of crosslinking may be predetermined by simple preliminary experiments as is standard in the polyester art.

The polyols used to prepare the polyesters of this invention are those which are reactive with acids and/or anhydrides and may include, for example, ethylene glycol, propylene glycol, diethylene glycol, dipropylene glycol, butanediol, hexanediol, dicyclopentadiene dimethanol, pentaerythritol, triethylene glycol, trimethylol propane, glycerol, or mixtures thereof. Preferably, the glycols used in this invention are ethylene glycol, propylene glycol and/or dipropylene glycol and/or diethylene glycol as the major glycol components.

The degree of reaction is conveniently determined using known methods by measuring the acid number and/or viscosity and/or by measuring the amount of water liberated in the reaction.

The resin is then recovered and blended with an ethylenically unsaturated monomer mixture comprised of (a) a monovinyl aromatic monomer or mixture of monovinyl aromatic monomers and (b) a divinyl aromatic or polyvinyl aromatic monomer or mixture of said monomers. Such monovinyl aromatic monomers are well known and include: styrene, α-methylstyrene, chlorostyrenes, vinyltoluenes, isopropenyl phenol and the like. The divinyl aromatic and polyvinyl aromatic monomers include the divinylbenzenes, the divinyltoluenes, trivinylbenzene, and the like.

The divinyl aromatic or polyvinyl aromatic monomer is typically used in lesser portion in the ethylenically unsaturated monomer mixture and generally comprises from about 33 to 1 percent of the total.

These polyester blends with unsaturated monomers preferably contain about 20 to about 60 percent by weight and most preferably about 30 to about 50 percent by weight of the monomers based on the weight of the polyester. A small amount of an inhibitor such as tertiary butyl catechol or the like may be added to this mixture.

DCPD modified unsaturated polyesteramides (PEAR) can also have their properties enhanced by techniques of the present invention. Essentially PEAR is a resin or resin precursor having a central esteramide chain terminated by at least one DCPD group. Such resins are disclosed in my copending application U.S. Ser. No. 333,221, filed Dec. 21, 1981. In that application are taught procedures for preparing those resins. The DCPD, unsaturated polycarboxylic acid and polyol are the same as above noted.

The polyamines used to prepare the polyesteramides of this invention may include, for example, ethylene diamine, propylene diamine, hexane-1,6-diamine, piperazine, 4,4'-methylenebis(cyclohexylamine), 2,2'-bis(4-aminocyclohexyl)propane, 4,4'-diaminodiphenyl ether, bis(aminomethyl)norbornane, toluene diamine, bis(aminomethyl)dicyclopentadiene, homopiperazine, aminoethylpiperazine and diethylenetriamine.

The PEAR can be prepared by a variety of procedures. Preferably they are prepared by the method called the "hydrolysis method," wherein molten α,β-unsaturated polycarboxylic anhydride and/or acid is partially hydrolyzed with less than the stoichiometric equivalent of water and reacted with less than or equal to the stoichiometric equivalent of the dicyclopentadiene derivative to form esterified derivative and containing unesterified acid and/or anhydride. This reaction may conveniently be performed in stages whereby reactants are added dropwise, thus controlling exotherms. Reactants can also be added continuously.

To the mixture of esterified DCPD and/or anhydride is added the polyol and polyamine. That addition can be a bulk addition wherein all of the polyol and polyamine are added in one step. Alternatively, the addition can be an incremental addition wherein all of the polyol and a fractional equivalent of the polyamine are added initially and allowed to react after which subsequent increments of polyamine are added. In all instances, water is continuously removed during the esteramidation step. The timing of the remaining polyamine additions can be easily determined by the amount of water removed, by acid number and/or by viscosity.

The resin is then recovered and blended with the ethylenically unsaturated monomer mixture as hereinbefore described.

The modified polyesteramides have properties that make them well adapted for coating, casting, lamination, molding, filament winding and other known fabrication procedures. A preferred use is in glass fiber laminates. The compositions prepared from the polyesteramides form articles that are especially useful in corrosive environments, high temperature environments or in some electrical insulating applications, such as encapsulation of electrical components.

The blend can then be cured by well-known and traditional methods.

The polyesteramides are curable by known catalyst systems. Peroxides, such as methyl ethyl ketone peroxides, can be used with or without known promoters, such as cobalt octoate or cobalt naphthenate, that function with such peroxides. Acyl peroxides, such as benzoyl peroxides can be used with or without promoters such as tertiary amines, including typically dimethyl aniline and N,N-dimethyl-p-toluidine. The concentrations of catalyst and promoter are adjusted within known limits of from about 0.1 to 3.0 weight percent depending on the rate of cure desired, the magnitude of the generated exotherm and for other known purposes. Known gelation retarding agents, such as p-benzoquinone, can be employed in the curing system.

The following examples are given to illustrate the invention and not to limit the scope of the invention. All parts and percentages are by weight unless otherwise specified.

EXAMPLE 1

Maleic anhydride (392.24 g) is added to a reactor and is heated to 70° C. under a nitrogen atmosphere. Water (51.36 g) is added and followed by DCPD concentrate (118.99 g) 2 minutes later. Additional DCPD (118.99 g) and water (17.12 g) is added to the reactor 20 minutes after the initial water addition. A third portion of DCPD (118.99 g) is added 15 minutes later, followed by a final portion of DCPD (118.99 g) after another 15 minutes. The temperature controller is set to 110° C. and this temperature is achieved 5 minutes later. After 30 minutes of reaction at 110° C., propylene glycol (237.43 g) is added to the reactor, and the temperature controller is set to 160° C. The steam condenser is started and nitrogen sparging is increased. After 2 hours at 160° C., the temperature controller is set at 205° C. Eighty-seven milliliters (ml) of water layer and 43 ml of organic material are collected. The reactor is cooled to 160° C. and 100 ppm of hydroquinone is added. The modified polyester alkyd is recovered as a clear, light yellow, tacky solid with a final acid number of 32.6.

The resulting modified polyester alkyd is formulated as shown in Table I. Formulations 1 and 4 are comparative standards containing 67.0 and 57.0 percent modified polyester alkyd plus 33.0 and 43.0 percent styrene, respectively and no DVB. Formulations 2, 3 and 5 contain the modified polyester alkyd, styrene and DVB in the indicated amounts.

Each of the formulations is used to prepare circular, clear, unfilled castings of 3.5 cm in diameter and 0.5 cm in thickness. A room temperature cure system consisting of 0.1 percent of 6 percent cobalt naphthenate, 1.0 percent methyl ethyl ketone peroxide, and 0.02 percent dimethylaniline is used, and is followed by post-curing of the room temperature cured castings for 2.0 hours at 93° C. Corrosion tests are performed in toluene for 7 days at 25° C. The results are reported in Table I.

Formulations 4 and 5 are used to determine the Brookfield viscosity (25° C.), as well as to prepare clear, unfilled castings for use in mechanical property evaluations. A cure system of 1.0 percent benzoyl peroxide and 0.01 percent dimethylaniline is used at room temperature, followed by post-curing the castings for 2.0 hours at 93° C. Flexural strength and modulus is determined using an Instron machine with standard test methods (ASTM D-790). Heat distortion temperature (264 psi, 1820 kPa) is determined using an Aminco machine with standard test methods (ASTM D-648). The results are reported in Table I.

TABLE I

Example 1: Corrosion Resistance Testing - Toluene 7 days at 25° C.

| Formulation | Alkyd (%) | Styrene (%) | Divinyl-benzene (%) | Initial Average Barcol Hardness | Change in Barcol Hardness (%) | Change in Weight 30 min. Recovery (%) | Change in Weight 24 hr Recovery (%) | Appearance |
|---|---|---|---|---|---|---|---|---|
| 1* | 57.0 | 43.0 | none | 44 | −11 | +0.65 | +0.23 | no change |
| 2 | 57.0 | 41.0 | 2.0 | 44 | −9 | +0.56 | +0.16 | no change |
| 3 | 57.0 | 38.0 | 5.0 | 40 | −1 | +0.41 | +0.11 | no change |
| 4* | 67.0 | 33.0 | none | 45 | −8 | +1.65 | +0.79 | no change |
| 5 | 67.0 | 31.0 | 2.0 | 44 | −6 | +0.57 | +0.27 | no change |

Physical Property Testing

| Divinyl aromatic | Brookfield Viscosity | Flexural Strength | Flexural Modulus |
|---|---|---|---|

TABLE I-continued

| Formu-lation | Alkyd (%) | Styrene (%) | benzene (%) | (cp or $10^3$ Pa.S) | HDT °C. | $10^4$ psi ($10^4$ kPa) | $10^5$ psi ($10^5$ kPa) |
|---|---|---|---|---|---|---|---|
| 4* | 67.0 | 33.0 | none | 90 | 91.4 | 1.1608 (8.003) | 5.78 (39.9) |
| 5 | 67.0 | 31.0 | 2.0 | 85 | 91.1 | 1.1438 (7.886) | 5.80 (40.0) |

*Not an embodiment of this invention.

The data of Table I demonstrates enhanced corrosion resistance to toluene by those modified polyester resins containing DVB. This enhancement of corrosion resistance appears to be a direct function of the DVB concentration.

EXAMPLE 2

Maleic anhydride (392.24 g) is added to a reactor and is heated to 70° C. under a nitrogen atmosphere. Water (54.06 g) is added and is followed by DCPD concentrate (132.90 g) 2 minutes later. Additional DCPD (132.90 g) and water (18.02 g) is later added to the reactor 20 minutes after the initial water addition. A third portion of DCPD (132.90 g) is added 15 minutes later and is followed by a final portion of DCPD (132.90 g) after another 15 minutes. The temperature controller is set at 110° C. and this temperature is achieved 12 minutes later. After 30 minutes of reaction time, propylene glycol (237.43 g) is added to the reactor, and the temperature controller is set at 160° C. The steam condenser is started and nitrogen sparging is increased. After 2 hours at 160° C., the temperature controller is later set to 205° C. Eighty-nine milliliters of water layer and 74 ml of organic material are collected. The reactor is cooled to 160° C. and 100 ppm of hydroquinone is added. The modified polyester alkyd is recovered as a clear, light yellow, tacky solid with a final acid number of 33.9.

The resulting modified polyester alkyd is formulated as shown in Table II and Table III. Formulations 6, 7 and 8 represent comparative standards containing no DVB. Formulations 9, 10 and 11 contain 2.0 percent DVB. Formulations 12, 13 and 14 contain 5.0 percent DVB. Formulation 15 contains 8.0 percent DVB and occurs only in Table III.

Each of the formulations is used to prepare circular, clear, unfilled castings for corrosion resistance evaluations using the technique of Example 1. Corrosion tests are extended to 12 days at 25° C. for both toluene (Test A) and 5 percent aqueous sodium hydroxide (Test B). The results are reported in Table III. Formulations 7, 10, 13 and 15 containing 67.0 percent alkyd each, 33.0, 31.0, 28.0 and 25.0 percent styrene, respectively, and none, 2.0, 5.0 and 8.0 percent DVB, respectively are used to prepare clear unfilled castings for mechanical property evaluations using the methods of Example 1. Tensile strength and percent elongation is determined using an Instron machine with standard test methods (ASTM D-638). The results are reported in Table III.

TABLE II

| Formu-lation | Alkyd (%) | Styrene (%) | Divinyl-benzene (%) | Initial Average Barcol Hardness | Change in Barcol Hardness (%) | Change in Weight | | Appearance |
|---|---|---|---|---|---|---|---|---|
| | | | | | | 30 min. Recovery (%) | 24 hr Recovery (%) | |
| 6* | 72.0 | 28.0 | none | | | | | |
| (A) | | | | 47 | −11 | ** | ** | fractures |
| (B) | | | | | 0 | | −0.03 | no change |
| 7* | 67.0 | 33.0 | none | 47 | | | | no change |
| (A) | | | | | −10 | +0.82 | +0.45 | |
| (B) | | | | | −3 | ** | −0.06 | |
| 8* | 57.0 | 43.0 | none | 45 | | | | no change |
| (A) | | | | | −14 | +0.76 | +0.34 | |
| (B) | | | | | 0 | ** | −0.03 | |
| 9 | 72.0 | 26.0 | 2.0 | 46 | | | | no change |
| (A) | | | | | −6 | +2.61 | +1.54 | |
| (B) | | | | | 4 | ** | −0.07 | |
| 10 | 67.0 | 31.0 | 2.0 | 45 | | | | |
| (A) | | | | | −7 | +0.66 | +0.35 | no change |
| (B) | | | | | 0 | ** | −0.06 | no change |
| 11 | 57.0 | 41.0 | 2.0 | 44 | | | | no change |
| (A) | | | | | −8 | +0.67 | +0.29 | |
| (B) | | | | | 5 | ** | −0.06 | |
| 12 | 72.0 | 23.0 | 5.0 | 46 | | | | no change |
| (A) | | | | | −2 | +2.21 | +1.35 | |
| (B) | | | | | −8 | ** | −0.09 | |
| 13 | 67.0 | 28.0 | 5.0 | 46 | | | | no change |
| (A) | | | | | −6 | +0.61 | +0.34 | |
| (B) | | | | | 9 | ** | −0.12 | |
| 14 | 57.0 | 38.0 | 5.0 | 45 | | | | no change |
| (A) | | | | | −11 | +0.58 | +0.29 | |
| (B) | | | | | 2 | ** | −0.05 | |

*Not an embodiment of this invention.
**Not measured.

TABLE III

| Formulation | Alkyd (%) | Strength (%) | Divinylbenzene (%) | Brookfield Viscosity (cp or $10^3$ Pa.S) | Average Barcol Hardness | Tensile Strength $10^3$ psi ($10^3$ kPa) | Elongation (%) | Flexural Strength $10^4$ psi ($10^4$ kPa) | Flexural Modulus $10^5$ psi ($10^5$ kPa) |
|---|---|---|---|---|---|---|---|---|---|
| 7* | 67.0 | 33.0 | none | 176 | 50 | 4.205 (28.99) | 0.90 | 1.1980 (8.260) | 5.93 (40.9) |
| 10 | 67.0 | 31.0 | 2.0 | 184 | 50 | 3.909 (26.95) | 0.72 | 1.0635 (7.333) | 6.10 (42.1) |
| 13 | 67.0 | 28.0 | 5.0 | 181 | 50 | 3.795 (26.17) | 0.71 | 1.3281 (9.157) | 5.79 (39.9) |
| 15 | 67.0 | 25.0 | 8.0 | ** | 52 | 3.370 (23.24) | 0.75 | 1.1219 (7.735) | 5.20 (35.9) |

*Not an embodiment of this invention.
**Not measured.

The data of Table II demonstrates enhanced corrosion resistance to both toluene and 5 percent aqueous sodium hydroxide. Although no significant changes in weight occurred due to exposure to 5 percent aqueous sodium hydroxide, the Barcol hardness values of the comparative standards (containing no DVB), 6, 7 and 8 are all slightly reduced (negative) or exactly unchanged (0) as compared to those formulations containing DVB (9–14) which all possess increased (positive) Barcol hardness values. Positive Barcol hardness values in this case may be indicative of continued curing.

The data of Table III demonstrates a slight reduction in tensile strength and percent elongation as a function of DVB use, however, the reduction of percent elongation as a function of DVB rapidly leveled out. The flexural strength and flexural modulus appeared to be unaffected by DVB use.

EXAMPLE 3

Maleic anhydride (392.24 g) is added to a reactor and is heated to 100° C. under a nitrogen atmosphere. Water (76.59 g) is added and immediately induced a maximum exother of 135° C. The temperature controller is set to 122° C. and this temperature is reached 12 minutes later. DCPD concentrate (159.5 g) is added to the reactor. Additional DCPD concentrate (159.5 g) is added 15 minutes after the initial DCPD concentrate addition. A final aliquot of DCPD concentrate (159.5 g) is added 15 minutes later and the temperature controller is then set to 130° C. This temperature was achieved 2 minutes later. After 30 minutes of reaction at 130° C., propylene glycol (237.43 g) is added. The temperature controller is set to 160° C., the steam condenser is started, and nitrogen sparging is increased. After 2 hours at 160° C., the temperature controller is then set to 205° C. Seventy-seven ml of water layer and 32.5 ml of organic material are collected. The reactor is cooled to 165° C. and 100 ppm of hydroquinone is added. The modified polyester alkyd is recovered as a tacky, pale yellow solid with a final acid number of 29.2.

The resulting modified polyester alkyd is formulated as shown in Table IV. Formulation 16 is a comparative standard containing 67.0 percent modified polyester alkyd and 33.0 percent styrene, there is no DVB. Formulations 17 and 18 contain the modified polyester alkyd, styrene and DVB in the indicated amounts. The formulations are used to prepare clear, unfilled castings of 1.0×1.5×0.15 inch dimensions. A room temperature cure system consisting of 1.0 percent benzoyl peroxide and 0.01 dimethylaniline is used and followed by post-curing of the room temperature cured castings for 2.0 hours at 93° C. Accelerated corrosion resistance tests are performed in toluene, 5 percent aqueous sodium hydroxide and 25 percent aqueous sulfuric acid at 50° C. for the indicated times.

The data of Table IV systemically demonstrates the enhanced corrosion resistance of the invention to toluene (Test A), 5 percent aqueous sodium hydroxide (Test B) and 25 percent aqueous sulfuric acid (Test C). The physical and mechanical properties of these polyesters are similar as demonstrated by the data of Table V.

TABLE IV

| Test Number | Alkyd (%) | Styrene (%) | Divinylbenzene (%) | Initial Average Barcol Hardness | Change in Barcol Hardness (%) | Change in Weight 30 min. Recovery (%) | 24 hr Recovery (%) | Appearance |
|---|---|---|---|---|---|---|---|---|
| 16* (A) | 67.0 | 33.0 | none | 50 | −49 | 2.89 | 1.01 | fractures after 3.5 hrs |
| (B) | | | | | −14 | | 0.19 | darkens slightly |
| (C) | | | | | −7 | | 0.34 | unchanged |
| 17 (A) | 67.0 | 31.0 | 2.0 | 49 | −41 | 2.49 | 0.82 | fractures after 4.5 hrs |
| (B) | | | | | −8 | | 0.22 | unchanged |
| (C) | | | | | −4 | | 0.27 | unchanged |
| 18 (A) | 67.0 | 28.0 | 5.0 | 51 | −42 | 1.99 | 0.48 | fractures after 4.5 hrs |
| (B) | | | | | −6 | | 0.16 | unchanged |
| (C) | | | | | −3 | | 0.26 | unchanged |

*Not an embodiment of this invention.
**Includes weight of test piece plus all recovered fractured pieces.

TABLE V

| Formulation | Alkyd (%) | Styrene (%) | Divinylbenzene (%) | Brookfield Viscosity (cp or $10^3$ Pa.S) | Average Barcol Hardness | Tensile Strength $10^3$ psi ($10^3$ kPa) | Elongation (%) | Flexural Strength $10^4$ psi ($10^4$ kPa) | Flexural Modulus $10^5$ psi ($10^5$ kPa) |
|---|---|---|---|---|---|---|---|---|---|
| 16* | 67.0 | 33.0 | none | 118 | 51 | 4.099 (28.25) | 0.81 | 0.8069 (5.563) | 5.97 (41.2) |
| 17 | 67.0 | 31.0 | 2.0 | 84 | 52 | 3.931 (27.10) | 0.79 | 1.0465 (7.215) | 5.89 (40.6) |
| 18 | 67.0 | 28.0 | 5.0 | 120 | 53 | 3.532 (24.35) | 0.71 | 0.9416 (6.492) | 5.78 (39.9) |

*Not an embodiment of this invention.

EXAMPLE 4

Maleic anhydride (196.12 g) is added to a reactor and is heated to 70° C. under a nitrogen atmosphere. Water (18.92 g) is added followed by DCPD concentrate (39.87 g) 2 minutes later. Additional DCPD (39.87 g) and water (6.31 g) are added to the reactor 20 minutes after the initial water addition. A third portion of DCPD (39.87 g) is added 15 minutes later and is followed by a final portion of DCPD (39.87 g) after an additional 15 minutes. The temperature controller is then set to 110° C. and this temperature is achieved 13 minutes later. After 30 minutes at 110° C., propylene glycol (118.72 g) is added to the reactor and the temperature controller is set to 160° C., the steam condenser is started and nitrogen sparging is increased. After 2 hours at 160° C., the temperature controller then is set to 205° C. Forty-one milliliters of water layer and 11 ml of organic material are collected. The reactor is cooled to 164° C. and 100 ppm of hydroquinone is added. The polyester alkyd is recovered as a clear, light yellow, tacky solid with a final acid number of 34.7.

The resulting modified polyester alkyd is formulated as shown in Table VI. Formulation 19 is a comparative standard containing 57.0 percent modified polyester alkyd and 43.0 percent styrene. Formulation 20 contains 56.0 percent modified polyester alkyd, 38.0 styrene and 5.0 percent DVB. A comparative formulation containing 57.0 percent of a commercial grade general purpose orthophthalic unsaturated polyester alkyd, and 43.0 percent styrene is also prepared, Formulation 21. All three formulations are used to prepare clear, unfilled castings. A room temperature cure system consisting of 1.0 percent benzoyl peroxide and 0.01 percent dimethylaniline is used followed by post-curing of the room temperature cured castings for 2.0 hours at 93° C. Accelerated corrosion resistance testing is performed in toluene (Test A) and 95 percent ethanol (Test D) at 52° C. for the times indicated in Table VI.

Enhanced corrosion resistance to both toluene and 95 percent ethanol results as demonstrated by the data of Table VI. The DCPD modified unsaturated polyester resin containing DVB not only outperformed its styrenated counterpart, but also significantly outperformed the general purpose styrenated orthophthalic unsaturated polyester, Formulation 21, in both the toluene and 95 percent ethanol corrosion resistance tests.

TABLE VI

| Formulation | Alkyd (%) | Styrene (%) | Divinylbenzene (%) | Initial Average Barcol Hardness [% Change] | Time to Initial Damage (hr.) |
|---|---|---|---|---|---|
| 19* | 57.0 | 43.0 | none | | |
| (A) | | | | 46 | 24 |
| (D) | | | | 47 [−75] | 648+ |
| 20 | 57.0 | 38.0 | 5.0 | 48 | |
| (A) | | | | [−73] | 69.5 |
| (D) | | | | | 648+ |
| 21 | 57.0 | 43.0 | none | 47 | |
| (A) | | | | | 42.5 |
| (D) | | | | | 216 |

*Not an embodiment of this invention.
**Not measured.

EXAMPLE 5

Maleic anhydride (686.42 g) is added to a reactor and is heated to 70° C. under a nitrogen atmosphere. Water (66.22 g) is added and is followed by DCPD concentrate (139.25 g) 2 minutes later. The DCPD concentrate contains 0.31 percent lights, 13.64 percent cyclopentadiene codimers and diolefin dimers and 86.05 percent DCPD. Additional DCPD concentrate (139.25 g) and water (22.08 g) are added to the reactor 20 minutes after the initial water addition. A third aliquot of DCPD concentrate (139.25 g) is added 15 minutes later. A final aliquot of DCPD concentrate (139.25 g) is added after an additional 15 minutes. The temperature controller is set to 110° C. and this temperature is achieved 1 minute later. After 30 minutes at 110° C., propylene glycol (373.96 g) and piperazine (47.03 g) are added to the reactor, the steam condenser is started, nitrogen sparging is increased, and the temperature controller set to 160° C. The 160° C. temperature is achieved 13 minutes later. After 2 hours at 160° C., the temperature controller is then set to 205° C. One hundred twenty-seven ml of water layer and 8 ml of organic material are collected. The reactor is cooled to 165° C. and 100 ppm of hydroquinone is added. The modified polyesteramide alkyd is recovered as a clear, light yellow solid with a final acid number of 26.6.

A portion of the modified polyesteramide alkyd is formulated to provide a 57.0 percent alkyd, 40.0 percent styrene, 3.0 percent DVB solution. A laminate is then prepared using the following standard hand-layup procedure.

A sheet of 0.005 inch (1.27 mm) Mylar film is attached to a smooth, flat surface with masking tape. An area of sufficient size is covered with a thin coating of the laminating resin and the surface C-veil (K514-236 treatment) is laid down and smoothed out. Additional resin is applied and the first layer of chopped (42.5 g) fiberglass mat (M113-K247) treatment is applied. This is carefully rolled down with a serrated aluminum roller to exclude all trapped air. Resin is added followed by a second layer of chopped (42.5 g) fiberglass mat. Rolling again removes entrapped air. After adding additional resin, the final surface C-veil is applied and smoothed out. Straight steel rails of ⅛ inch (31.75 mm) square in cross-section are placed along all four sides of the laminate. A cover sheet of Mylar is rolled onto a 2-inch (5.08 cm) diameter tube long enough to bridge the rails. Additional resin is added to the laminate and the Mylar is rolled out over it. The Mylar is then stretched tightly and taped down. Any entrappd air or excess resin is squeezed out of the laminate using a wooden tongue depressor. The laminate is left until the polymerization exotherm has subsided and cooling to ambient temperature has occurred. The laminate is removed and post-cured at 93° C. for 2.0 hours.

A cure system of 1.0 percent methyl ethyl ketone peroxide and 0.3 percent cobalt naphthenate (6 percent) is used for the laminate. The modified unsaturated polyesteramide resin is retarded with 100 ppm of p-benzoquinone prior to lamination. This is necessary to prevent gelation during the laminate preparation.

The corrosion resistance to 5.0 percent aqueous sodium hydroxide maintained at 98.9° C. is determined using a pair of 3.5×4.5 inch coupons cut from the laminate. The edges of each coupon are beveled and then edge coated with styrenated DCPD modified unsaturated polyesteramide resin containing a small amount of dissolved paraffin wax and are cured using a benzoyl peroxide-dimethylaniline cure system at 60° C. The pair of coupons are loaded into a stainless steel rack and placed into a stainless steel corrosion test bath fitted with a chilled reflux condenser and containing adequate 5.0 percent sodium hydroxide to cover all coupons. The bath temperature is maintained at 98.9° C. A coupon is removed from the stainless steel corrosion resistance test bath after 336 and 720 hours of exposure, respectively. All coupons are sealed in plastic and kept moist until testing is completed. Tests include measurement of weight and thickness (both before and after exposure), Barcol hardness and flexural strength, plus flexural modulus on 3 samples prepared from each exposed coupon. Standard pre-exposure mechanical properties (0 hours) are determined using nonexposed sections of laminate. Flexural strength and flexural modulus testing was performed using the method of Example I. The following results are obtained.

|  | Initial 0 hrs | After 336 hrs | After 720 hrs |
|---|---|---|---|
| Barcol Hardness | 47 | 30 | 29 |
| [percent change] |  | [−37] | [−39] |
| Change in Weight (percent) | — |  | +10.04 |
| Change in Thickness (percent) | — |  | +7.89 |
| Flexural Strength |  |  |  |
| $10^3$ psi | 15.296 | 12.564 | 10.607 |
| ($10^3$ kPa) | (105.46) | (86.62) | (73.13) |
| [percent change] |  | [−17.86] | [−30.66] |
| Flexural Modulus |  |  |  |
| $10^5$ psi | 6.79 | 5.90 | 3.43 |
| ($10^5$ kPa) | (46.8) | (40.7) | (23.6) |
| [percent change] |  | [−13.1] | [−49.5] |

COMPARATIVE EXAMPLE 6

A portion of the modified polyesteramide of Example 5 is formulated to provide a 57.0 percent alkyd, 43.0 percent styrene solution. Lamination and corrosion resistance testing is then performed following the methods of Example 5. The following results are obtained.

|  | Initial Value 0 hrs | After 336 hrs | After 720 hrs |
|---|---|---|---|
| Barcol Hardness | 50 | 30 | 9 |
| [percent change] |  | [−39] | [−82] |
| Change in Weight (percent) | — |  | +14.26 |
| Change in Thickness (percent) | — |  | +5.56 |
| Flexural Strength |  |  |  |
| $10^3$ psi | 19.066 | 10.901 | 7.823 |
| ($10^3$ kPa) | (131.45) | (75.16) | (53.94) |
| [percent change] |  | [−42.83] | [−58.97] |
| Flexural Modulus |  |  |  |
| $10^5$ psi | 6.59 | 6.05 | 3.40 |
| ($10^5$ kPa) | (45.4) | (41.7) | (23.4) |
| [percent change] |  | [−8.19] | [−48.4] |

What is claimed is:

1. A resin formulation having improved properties comprised essentially of:
   (a) a dicyclopentadiene modified unsaturated polyester, polyesteramide, or a mixture thereof,
   (b) a monovinyl aromatic monomer or mixture of monovinyl aromatic monomers, and
   (c) a polyvinyl aromatic monomer or mixture of polyvinyl aromatic monomers wherein components (b) and (c) are present in amounts of 20 to 60 percent by weight of component (a), and component (c) comprises 1 to 33 percent by weight of the total weight of (b) and (c).

2. The resin of claim 1 where component (a) is a dicyclopentadiene modified unsaturated polyester.

3. The resin of claim 1 where component (a) is a dicyclopentadiene modified unsaturated polyesteramide.

4. The resin of claim 1, 2 or 3 where component (c) is between about 1 weight percent and about 15 weight percent of the total vinyl aromatic monomers, components.

5. The resin of claim 1, 2 or 3 where component (c) is a divinyl aromatic monomer.

6. The resin of claim 1 where component (c) is divinylbenzene.

7. The resin of claim 2 where component (c) is divinyl benzene.

8. The resin of claim 3 where component (c) is divinylbenzene.

9. The resin of claim 1, 2 or 3 where component (b) is styrene.

10. A cured resin of the resin formulation of claim 1.

11. A cured resin of the resin formulation of claim 2.

12. A cured resin of the resin formulation of claim 3.

13. A fiber reinforced laminate of the resin formulation of claim 1.

14. A fiber reinforced laminate of the resin formulation of claim 2.

15. A fiber reinforced laminate of the resin formulation of claim 3.

* * * * *

UNITED STATES PATENT AND TRADEMARK OFFICE
CERTIFICATE OF CORRECTION

PATENT NO. : 4,443,580
DATED : April 17, 1984
INVENTOR(S) : Robert E. Hefner, Jr.

It is certified that error appears in the above—identified patent and that said Letters Patent is hereby corrected as shown below:

Column 3, line 11, "dropwise" should read --stepwise--.

TABLE III, bridging Columns 7 and 8, sub-heading of column 3, "Strength" should read --Styrene--

TABLE IV, bridging Columns 7 and 8, sub-heading "Change in Weight" should read --Change in Weight**--

Column 11, line 12, "Any entrappd" should read --Any entrapped--.

Column 12, line 45 (Claim 4, line 4), after "nents" insert missing --[(b) and (c)]--.

Signed and Sealed this

Thirtieth Day of October 1984

[SEAL]

Attest:

Attesting Officer

GERALD J. MOSSINGHOFF

Commissioner of Patents and Trademarks